Jan. 6, 1931.　　　J. SCHADE　　　1,787,957
LOOSE LEAF RING BOOK
Filed Nov. 29, 1929
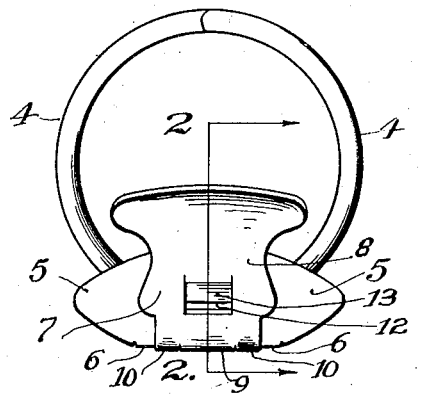
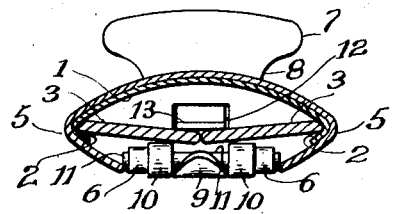
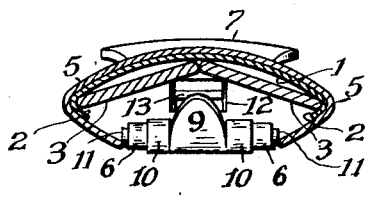
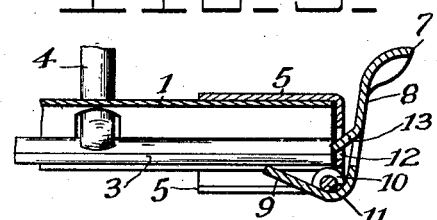
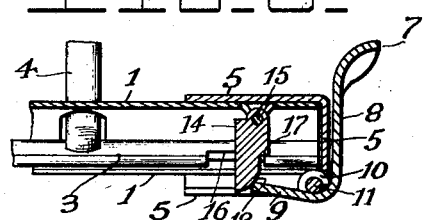
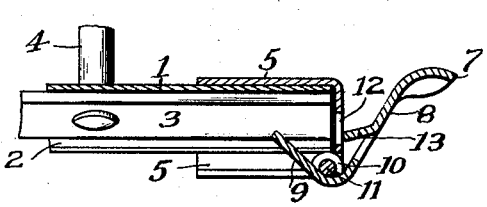
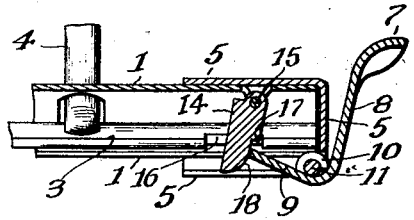
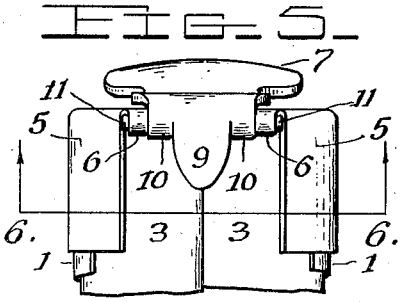
Inventor
John Schade
by
Attorney Patented Jan. 6, 1931

1,787,957

UNITED STATES PATENT OFFICE

JOHN SCHADE, OF HOLYOKE, MASSACHUSETTS, ASSIGNOR TO NATIONAL BLANK BOOK COMPANY, OF HOLYOKE, MASSACHUSETTS, A CORPORATION OF MASSACHUSETTS

LOOSE-LEAF RING BOOK

Application filed November 29, 1929. Serial No. 410,392.

This invention relates to loose leaf books of the kind known as "ring books", which comprise a spring plate with a pair of prong-carrying leaves whose inner edges are pivoted together and whose outer edges are confined within the lower down-turned lateral edges of said plate, these prongs being complementary parts of a ring, that is to say, when the prongs are closed they form a ring. The construction and operation of ring books, such as described briefly above are well known, and the parts will hereinafter be merely referred to and properly designated.

In ring books of this description, it has been common to employ what are known as "boosters" that are pivotally connected at the ends of the loose leaf structure and are operated to throw the prong carrying leaves upwardly to open the prongs.

The present invention relates solely to ring books employing boosters, and has for its object to lock the prong-carrying leaves after they have been thrown downwardly to close the prongs, this locking being effected by a part carried or operated by the booster itself.

The locking of the prong-carrying leaves by the inward swing of the booster when the leaves are thrown downwardly to close the prongs, and the release of these leaves from the locking means when the booster is thrown outwardly to cause the opening of the prongs, are believed to be broadly new, and therefore it is immaterial whether the booster itself carries the locking means or whether the latter is a separate element that is operated by the booster.

In the accompanying drawings which form a part of this application.

Figure 1 is an end view of a ring binder equipped with a preferred form of booster, the prongs being in closed condition.

Figure 2 is a broken section at the line 2—2 of Figure 1.

Figure 3 is also a broken section taken at the line 2—2 of Figure 1, but showing the position of parts when the booster has been thrown outwardly to release the prong-carrying leaves from the lock and preparatory to the final operation of the booster to throw the leaves upwardly to open the prongs.

Figure 4 is likewise a section on the line 2—2 of Figure 1, but showing the position of parts when the booster has been finally operated to throw the leaves upwardly so that the prongs will be opened.

Figure 5 is a broken bottom view of one end of the ring binder.

Figures 6 and 7 are sections at the line 6—6 of Figure 5 showing the position of the parts as illustrated at Figures 2 and 4 respectively, and Figures 8 and 9 are sections similar to Figures 2 and 3, but showing a modified form of the invention.

Similar numerals of reference denote like parts in the several figures of the drawing.

1 is a plate made of spring-metal having its outer lateral edges turned downwardly and inwardly to form pockets 2, 3 are elongated toggle leaves whose inner edges are pivoted together and whose outer edges are confined within said pockets, and 4 are arch-shaped prongs that are carried by these leaves and that project upwardly above said plate so as to form, when closed, a ring as shown at Figure 1.

Since both ends of the ring binder are exactly alike only one end will be described hereinafter.

5 is an end cap secured in any suitable manner to the end of the binder and serving to exclude dirt or other foreign matter, this cap having formed therewith at its lower edge spaced hinge eyes 6.

7 generally denotes the booster which comprises an upwardly extending portion 8 suitably shaped for convenient manipulation, and a lower inwardly extending tongue-like portion 9 which underlies the leaves 3 at their inner hinged edges, and integral with the booster and flanking the outer portion of this tongue 9 are spaced hinge eyes 10 which are alined with the eyes 6 of the end cap and a pintle 11 inserted through the eyes, so that it will be readily understood that the booster is hinged at its lower outer end to the end cap with an intermediate or tongue-like portion 9 extending inwardly beneath the leaves 3.

Referring to Figures 1, 2, 3, 4, 5, 6 and 7, the end cap 5 is provided with an opening 12 at or about the middle portion of its outer wall, and the upward part 8 of the booster has a lug 13 that is lanced therefrom and is bent inwardly so that when said booster is thrown inwardly this lug 13 will pass through the opening 12 and immediately overlie the leaves 3, when the latter have been thrown downwardly to close the prongs, as is shown at Figures 2 and 6, and it will be clear that when the parts are in the position shown at these figures the prongs cannot be opened manually since the leaves will be held by means of this lug 13.

It will be noticed by reference to Figures 2 and 6 that the tongue 9 is slightly spaced from the leaves after the latter have been thrown down by the closing of the prongs, and when the booster is operated to throw the leaves upwardly this tongue must travel throughout this space before it comes in operative contact with the leaves, and during this travel the lug 13 will have been withdrawn from its position above the leaves, as shown at Figure 3, so that there will be nothing to obstruct the further operation of the booster to open the prongs and the parts can then readily assume the positions shown at Figures 4 and 7.

It will therefore be clear that in the construction just described the booster may be integrally constructed so as to provide both the means for operating against the leaves to open the prongs and the means for locking the leaves so that they cannot be operated after the prongs have been closed.

But it is a very simple matter to provide a separate locking lug or dog that is not carried by the booster but is operated by it so as to produce the results above described, and referring particularly to Figures 8 and 9 this construction will now be described.

14 is a trip dog pivoted to the top of the loose leaf structure, as at 15 to the inner top wall of the plate 1, and depending through an opening 16 in the toggle leaves 3, half of this opening appearing in the single leaf shown at these Figures 8 and 9.

Formed on the dog is a shoulder 17 which overlaps the leaves 3 when they are in their normal position with the prongs closed, so that the manual opening of the later is prevented by the abutment of the leaves against said shoulder, as clearly shown at Figure 8.

The lower edge of this dog is rounded or beveled as shown at 18 and is immediately above the end of the tongue 9, and when the latter is thrown upwardly by the outward swing of the booster, this edge 18 will be contacted by said tongue and the dog thereby swung to release the leaves from the shoulder 17 as shown at Figure 9, and the continued swing of the booster will operate the tongue against the leaves to open the prongs, the dog being then wholly depending through said opening 16.

When the prongs are closed, the toggle leaves will be thrown downward and the dog will swing by gravity and position the shoulder above said leaves as above set forth.

It is therefore immaterial whether the means for locking the prongs closed is an integral part of the booster or a part carried thereby, or whether said means is a separate element that is acted upon by the booster, as in both instances this means is actuated by the swinging movements of the booster, and therefore the construction just described is fully within the scope of the invention.

What is claimed is:—

1. In a loose leaf structure, comprising a spring plate, a pair of prong-carrying leaves hingedly connected along their inner edges and confined at their outer edges within said plate, a booster pivoted at an end of said structure, and means actuated by the inward and outward movements of said booster for respectively locking said leaves with the prongs closed and releasing said leaves and operating them to open said prongs.

2. In a loose leaf structure, comprising a spring plate, a pair of prong-carrying leaves whose inner edges are hingedly connected and whose outer edges are confined within said plate, means for operating said leaves to open the prongs, and means actuated by the first-named means for locking said leaves with the prongs closed.

3. A loose leaf structure, comprising a spring plate, a pair of prong-carrying leaves whose inner edges are hingedly connected and whose outer edges are confined within said plate, and means pivoted to an end of said structure and operable to lock said leaves with the prongs closed and to unlock the leaves preparatory to the final operation of said means for opening said prongs.

4. A loose leaf structure, comprising a spring plate, a pair of prong-carrying leaves whose inner edges are hingedly connected and whose outer edges are confined within said plate, and means pivoted to an end of said structure for locking said leaves with the prongs closed and for unlocking the leaves and subsequently operating them to open the prongs.

5. In a loose leaf structure, comprising a spring plate, a pair of prong-carrying leaves whose inner edges are hingedly connected and whose outer edges are confined within said plate, a booster pivoted at one end of said structure and having an upstanding portion and at its bottom a tongue which extends inwardly below said leaves and in spaced relation thereto when the prongs are closed, a lug lanced from said portion and bent inwardly and normally overhanging said leaves in substantial abutment therewith when the prongs are closed, said booster capable of being swung outwardly to primarily withdraw said lug from locking engagement with said leaves before said tongue has come into engagement with the leaves, and to subsequently force the tongue against the leaves to open the prongs.

6. In a loose leaf structure, comprising a spring plate, a pair of prong-carrying leaves whose inner edges are hingedly connected and whose outer edges are confined within said plate, an end cap at one end of said structure having an opening in its outer wall and spaced hinge eyes at its bottom edge, a booster having an upstanding portion and a tongue at the bottom that extends inwardly beneath said leaves in spaced relation thereto when they have been operated to close the prongs, said booster having hinge eyes at the bottom intermediate said portion and tongue which eyes are alined with the eyes on said cap and a pintle inserted through the alined eyes, said portion having a lug that extends inwardly through said opening and overhangs said leaves in substantial abutment therewith after they have been operated to close the prongs, the initial outward swing of the booster serving to withdraw said lug from locking engagement with said leaves, the tongue meanwhile being moved into operative engagement with the leaves, and the final outward swing of the booster causing said tongue to force the leaves upwardly to open the prongs.

7. In a loose leaf structure, comprising a spring plate, a pair of prong-carrying leaves whose inner edges are hingedly connected and whose outer edges are confined within said plate, a member pivoted at an end of said structure, and devices actuated by said member for opening said prongs and for locking the latter when closed.

8. A construction as in claim 7 further distinguished in that said devices are carried by said member and act against said leaves below and above them respectively.

In testimony whereof I affix my signature hereto.

JOHN SCHADE.